(12) United States Patent
Zhou et al.

(10) Patent No.: US 6,916,528 B2
(45) Date of Patent: Jul. 12, 2005

(54) METHODS FOR MANUFACTURING SILVER MULTILAYERED FILMS AND THE ARTICLES OBTAINED THEREFROM

(75) Inventors: Hongyi Zhou, Niskayuna, NY (US); Hua Wang, Clifton Park, NY (US); John Frederick Graf, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 10/452,042

(22) Filed: May 30, 2003

(65) Prior Publication Data

US 2004/0241420 A1 Dec. 2, 2004

(51) Int. Cl.[7] .......................... B32B 19/02; B32B 27/06
(52) U.S. Cl. ...................... 428/323; 428/324; 428/328; 428/412; 428/480
(58) Field of Search .................. 428/412, 480, 428/323, 324, 328

(56) References Cited

U.S. PATENT DOCUMENTS

| | | | |
|---|---|---|---|
| 4,643,937 A | 2/1987 | Dickinson et al. | 428/215 |
| 4,931,324 A | 6/1990 | Ellison et al. | 428/31 |
| 4,992,322 A | 2/1991 | Curry et al. | 428/215 |
| 5,030,505 A | 7/1991 | Dickinson | 428/215 |
| 5,424,119 A | 6/1995 | Phillips et al. | 428/328 |
| 5,846,659 A | 12/1998 | Lower et al. | 428/412 |
| 6,087,007 A | 7/2000 | Fujii et al. | 428/412 |
| 6,136,441 A | 10/2000 | MacGregor et al. | 428/412 |
| 6,143,839 A | 11/2000 | Webb et al. | 525/439 |
| 6,203,913 B1 | 3/2001 | Kondos et al. | 428/423.1 |
| 6,294,647 B1 | 9/2001 | Brunelle et al. | 528/486 |
| 6,306,507 B1 | 10/2001 | Brunelle et al. | 428/423.7 |
| 6,350,521 B1 | 2/2002 | Chen et al. | 428/412 |
| 6,462,168 B1 | 10/2002 | Siclovan et al. | 528/196 |
| 6,559,270 B1 | 5/2003 | Siclovan et al. | 528/196 |
| 2001/0055671 A1 | 12/2001 | Pickett et al. | 428/195 |
| 2003/0008134 A1 | 1/2003 | Murar et al. | 428/332 |

FOREIGN PATENT DOCUMENTS

| | | |
|---|---|---|
| EP | 0 261 815 | 8/1987 |
| EP | 1 302 309 A2 | 4/2003 |
| WO | WO 00/09312 | 2/2000 |

OTHER PUBLICATIONS

H. Zhou et al. "Development of Silver Metallic Co-Extruded Films" GE Global Research, Technical Information Series, Apr. 2003.

*Primary Examiner*—Monique R. Jackson
(74) *Attorney, Agent, or Firm*—Cantor Colburn LLP

(57) ABSTRACT

A silver multilayered film comprises at least one intermediate layer comprising a polymeric resin; a colorant composition and a flake composition, wherein the normal to the individual flakes are oriented at an average angle of about 0 to about 75 degrees with a normal to the multilayered film, and wherein the intermediate layer is located between a first layer and an second layer and further wherein the multilayered film has a lightness greater than or equal to about 60 and a change in lightness as a function of viewing angle of greater than or equal to about 40. A multilayered film comprises an intermediate layer disposed on and in intimate contact with a surface of a first layer and a second layer disposed on and intimate contact with a surface of the intermediate layer opposite the first layer, wherein the intermediate layer comprises a polymeric resin; a colorant composition and a flake composition, wherein the normal to the individual flakes are oriented at an average angle of about 0 to about 75 degrees with a normal to the multilayered film, and further wherein the multilayered film has a lightness greater than or equal to about 60 and a change of lightness as a function of viewing angle of greater than or equal to about 40.

36 Claims, 11 Drawing Sheets

• C-mica filled back layer reflects transmitted light to increase total L* and improve flop

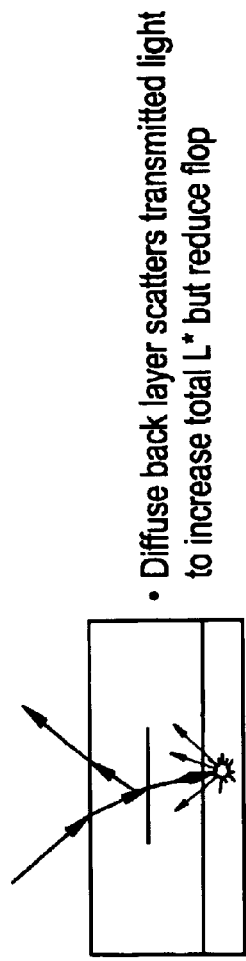
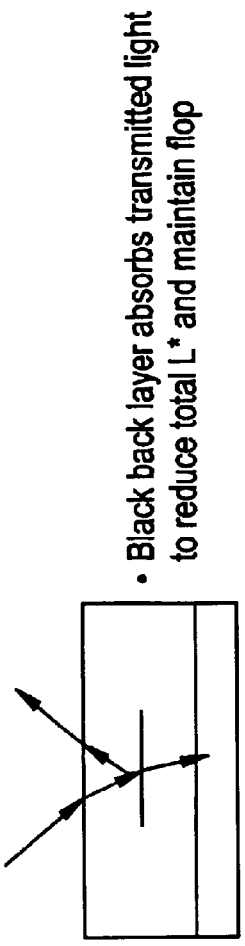
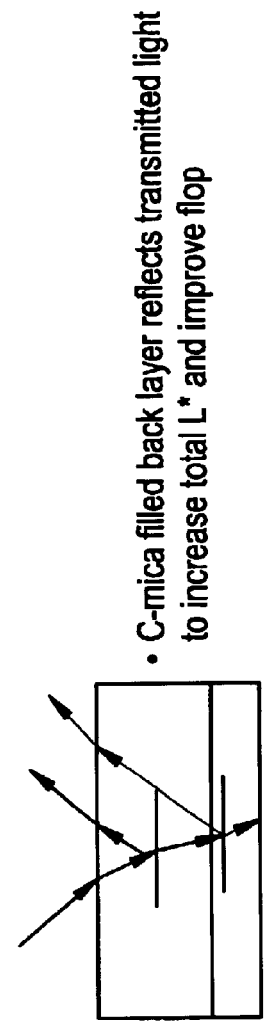
FIG. 3A — Diffuse back layer scatters transmitted light to increase total L* but reduce flop
FIG. 3B — Black back layer absorbs transmitted light to reduce total L* and maintain flop
FIG. 3C — C-mica filled back layer reflects transmitted light to increase total L* and improve flop

METHODS FOR MANUFACTURING SILVER MULTILAYERED FILMS AND THE ARTICLES OBTAINED THEREFROM

BACKGROUND

This disclosure relates to methods for manufacturing silver multilayered films and the articles obtained therefrom.

Decorative and aesthetic surface finishes on manufactured goods such as automobiles, refrigerators, computers, electronic goods, or the like, are generally provided by painting. Commercially used painting processes for attaining such surface finishes are spray painting, electrostatic spray painting, dip coating and the like. The development of paints for such surface finishes however, is generally considered to be expensive because of the high investment costs related to plant installation and maintenance as well as the high costs related to manufacturing the paint. In addition, the application of paints to various manufactured goods gives rise to environmental problems such as the release of volatile organic compounds into the atmosphere. It is therefore generally desirable to provide surface finishes for finished goods that are both inexpensive and minimize some of the environmental problems associated with the use of paints.

SUMMARY

A silver multilayered film comprises at least one intermediate layer comprising a polymeric resin; a colorant composition and a flake composition, wherein the normal to the individual flakes are oriented at an average angle of about 0 to about 75 degrees with a normal to the multilayered film, and wherein the intermediate layer is located between a first layer and an second layer and further wherein the multilayered film has a lightness greater than or equal to about 60 and a change in lightness as a function of viewing angle of greater than or equal to about 40.

A multilayered film comprises an intermediate layer disposed on and in intimate contact with a surface of a first layer and a second layer disposed on and intimate contact with a surface of the intermediate layer opposite the first layer, wherein the intermediate layer comprises a polymeric resin; a colorant composition and a flake composition, wherein the normal to the individual flakes are oriented at an average angle of about 0 to about 75 degrees with a normal to the multilayered film, and further wherein the multilayered film has a lightness greater than or equal to about 60 and a change of lightness as a function of viewing angle of greater than or equal to about 40.

A method of manufacturing a multilayered film comprises deforming a film comprising an intermediate layer located between a first layer and a second layer, by an amount effective to produce a multilayered film having a lightness greater than or equal to about 60 and a change of lightness as a function of viewing angle greater than or equal to about 40.

DESCRIPTION OF THE FIGURES

FIG. 3 is a schematic illustration of the present method for producing a silver surface in a multilayered film;

DETAILED DESCRIPTION OF PREFERRED EMBODIMENTS

Disclosed herein is a method for obtaining silver multilayered films which can be advantageously used to provide an aesthetic and decorative surface finish for automobile parts, computers, refrigerators, or the like. The silver multilayered film has at least one layer comprising a polymeric resin, flakes having a white or silver coloration and a colorant composition. The flakes may either have a white or silver coloration or they may comprise a combination of colors that are blended together to produce a white or silver coloration. In an exemplary embodiment, the composition of the flakes may be adjusted to provide a metallic luster to the silver multilayered film. In one embodiment, the silver multilayered film may be applied to any substrate in order to modify the color and appearance of the substrate. In another embodiment, the silver multilayered film may be applied to the substrate by additional processes involving lamination, coextrusion or by an in-mold process wherein a silver multilayered film is placed in the mold and a thermoplastic and/or thermosetting melt, which forms the substrate or base layer, is injection molded on to the exposed surface of the silver multilayered film.

Figure 1:
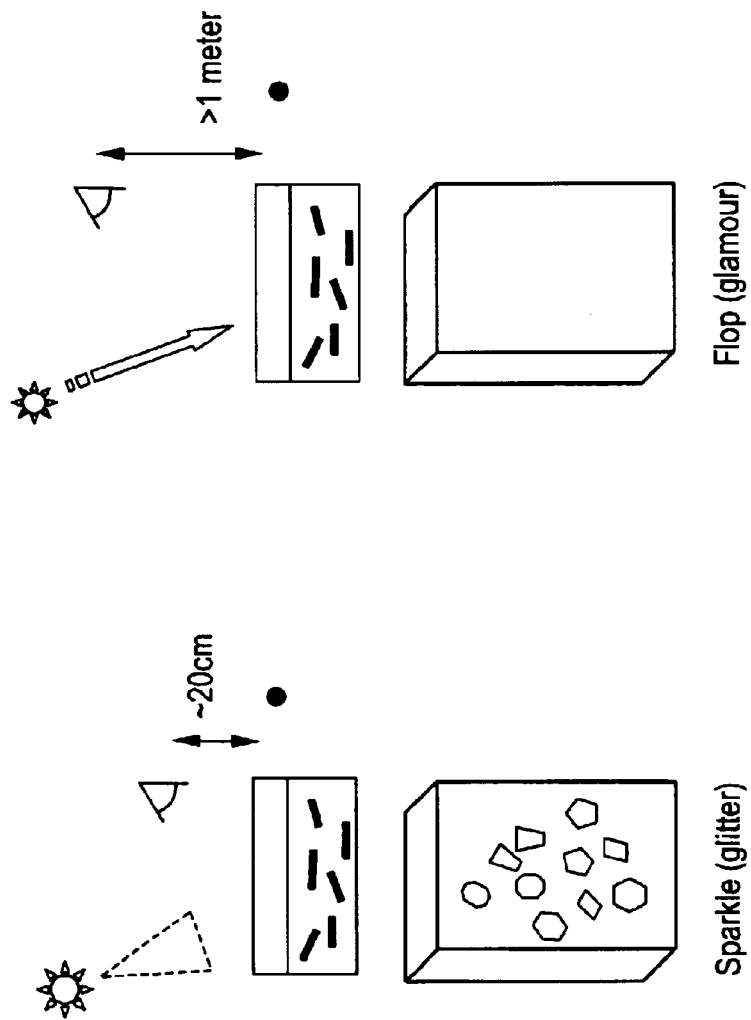
FIG. 1 is a schematic representation of two aspects of metallic appearance a) sparkle (glitter) and b) flop (glamour) in a thermoplastic resin containing flakes.

A metallic appearance is one of the most appealing surface finishes for automobile exteriors. It is generally the result of a combination of sparkle (glitter) and flop (glamour). The sparkle or glitter refers to a close-distance viewing effect (micro-appearance,) where the flakes act as tiny mirrors with glint reflection. The flop or glamour refers to a long range distance viewing effect (macro-appearance), where a pronounced reduction in lightness occurs as the angle at which the surface is viewed changes from on-specular to off-specular angles. The flop is also commonly referred to as the change of lightness as a function of viewing angle. Both aspects of metallic appearance are schematically illustrated in FIG. 1.

Metallic silver is a special type of metallic appearance and is not easily attainable. It focuses more on the long range distance viewing effect with a combination of high lightness and high angular flop a well as some minor degree of sparkle—resembling the appearance of noble silver metal. Lightness as defined herein is a measure of the brightness of the object and it is generally measured by using a commercially available spectrometer. The term 'flop' is used to describe the change in lightness as a function of viewing angle and it is measured with special spectrometers at multiple angles. Generally the flop is measured at least four angles simultaneously. In order to achieve a metallic silver finish in a multilayered film, it is generally desirable to have a high value of both lightness (L*) and a high value of flop (i.e., the change of lightness as a function of viewing angles ($\Delta L^*$)).

As stated above, the silver multilayered film generally comprises a multilayered film wherein at least one of the layers comprises a polymeric resin, a flake composition having a silver or a white color (as obtained by additive color mixing of colored flakes) and a colorant composition. The multilayered film generally comprises a first layer, at least one intermediate layer and a second layer. The intermediate layer containing the flakes and the colorant is located between the first and second layers. As used herein the term 'located' permits the presence of other layers between the first and the second layer. It may be desirable to have additional layers such as a third and/or fourth layer also located between the first and second layers. Additionally, it may be desirable to dispose additional layers on a surface of the first layer on a side of the first layer opposite to the side that is closest to the intermediate layer.

In one exemplary embodiment, the intermediate layer is disposed upon and in intimate contact with at least a portion of the surface of the first layer and the second layer is disposed upon and in intimate contact with at least a portion of the surface of the intermediate layer opposite the first layer. As used herein, the term 'disposed' means that a particular layer has a particular location and is in intimate contact with at least a portion of the surface adjacent to it. The first layer may optionally comprise the same or different flake composition as the intermediate layer. The first layer may also optionally comprise suitable fillers to provide physical reinforcement to the entire film. The first layer is generally the layer that is closest to the surface upon which the film is disposed. In one embodiment, the surface upon which the film is disposed may be a substrate such as an automobile exterior body panel. The second layer is generally the layer having at least a portion of the surface in contact with ambient air.

Polymeric resins for use in the first, intermediate and second layers may generally be either thermoplastic resins or thermosetting resins or a blend of thermoplastic resins and thermosetting resins. Thermoplastic resins that may be used in the first, intermediate and second layers may be oligomers, polymers, ionomers, dendrimers, copolymers such as block copolymers, graft copolymers, star block copolymers, random copolymers, or the like, or combinations comprising at least one of the foregoing resins. Suitable examples of thermoplastic resins are polyolefins such as polyethylene, polypropylene; polyamides such as Nylon 4,6, Nylon 6, Nylon 6,6, Nylon 6, 10, Nylon 6, 12; polyesters such as polyethelene terephthalate (PET), polybutylene terephthalate (PBT), poly(1,4-cyclohexane-dimethanol-1,4-cyclohexanedicarboxylate) (PCCD), poly(trimethylene terephthalate) (PTT), poly(cyclohexanedimethanol-co-ethylene terephthalate) (PETG), poly(ethylene naphthalate) (PEN), poly(butylene naphthalate) (PBN); polyimides, polyacetals, polyacrylics, polycarbonates (PC), polystyrenes, polyamideimides, polyarylates, polyacrylates, polymethacrylates such as polymethylmethacrylate (PMMA), polyurethanes, polyarylsulfones, polyethersulfones, polyarylene sulfides, polyvinyl chlorides, polysulfones, polyetherimides, polytetrafluoroethylenes, polyetherketones, polyether etherketones, polyarylene ethers, liquid crystalline polymers, or the like, or combinations comprising at least one of the foregoing polymeric resins.

Blends of thermoplastic resins may also be used in the first, intermediate and second layers. Suitable blends of thermoplastic resins are acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/polyurethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyethylene/nylon, polyethylene/polyacetal, polycarbonate/poly(1,4-cyclohexane-dimethanol-1,4-cyclohexanedicarboxylate), polycarbonate/poly(cyclohexanedimethanol-co-ethylene terephthalate), polycarbonate/polymethylmethacrylate, polycarbonate/poly(1,4-cyclohexane-dimethanol-1,4-cyclohexanedicarboxylate)/poly(cyclohexanedimethanol-co-ethylene terephthalate), polyphenylene ether/polyamide, polyphenylene ether/polystyrene, or the like.

Suitable examples of thermosetting resins that may be used in either the first, intermediate or second layers are polyurethanes, natural rubber, synthetic rubber, epoxy, phenolic, polyesters, polyamides, silicones, or the like, or combinations comprising at least one of the foregoing thermosetting resins.

Preferred polymeric resins for the multilayered film are polycarbonates, polyesters, blends and copolymers of polycarbonates with polyesters. As used herein, the terms "polycarbonate", "polycarbonate composition", and "composition comprising aromatic carbonate chain units" includes compositions having structural units of the formula (I):

(I)

in which greater than or equal to about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O$_2$)—, —C(O)—, methylene, cyclohexylmethylene, 2-[2,2,1]-bicycloheptylidene, ethylene, isopropylidene, neopentylidene, cyclohexylidene, cyclopentadecylidene, cyclododecylidene, adamantylidene, or the like. In another embodiment, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates may be produced by the Schotten-Bauman interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

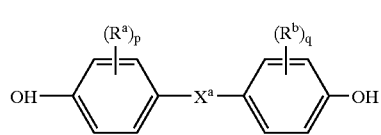
(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

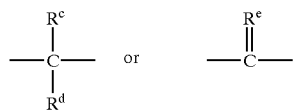
(IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by formula (III) include the bis(hydroxyaryl) alkane series such as, 1,1-bis(4-hydroxyphenyl)methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl) propane, 2,2-bis(4-hydroxy-3-bromophenyl)propane, or the like; bis(hydroxyaryl)cycloalkane series such as, 1,1-bis(4-hydroxyphenyl)cyclopentane, 1,1-bis(4-hydroxyphenyl) cyclohexane, or the like, or combinations comprising at least one of the foregoing bisphenol compounds.

Other bisphenol compounds that may be represented by formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl) sulfides, such as 4,4'-dihydroxy diphenyl sulfide, 4,4'-dihydroxy-3,3'-dimethyl diphenyl sulfide, or the like; bis(hydroxy diaryl)sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other bisphenol compounds that may be utilized in the polycondensation of polycarbonate are represented by the formula (V)

(V)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (V), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations comprising at least one of the foregoing bisphenol compounds.

Bisphenol compounds such as 2,2,2',2'-tetrahydro-3,3,3',3'-tetramethyl-1,1'-spirobi-[1H-indene]-6,6'-diol represented by the following formula (VI) may also be used.

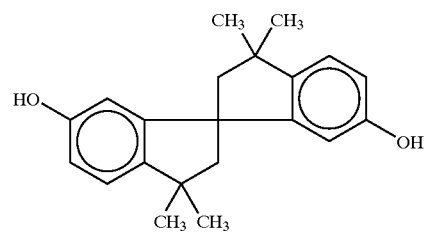
(VI)

The preferred bisphenol compound is bisphenol A.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl)carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates, as well as blends of linear polycarbonate and a branched polycarbonate may also be used in the outer, intermediate and first layers of the silver multilayered film. The branched polycarbonates may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate in a given layer.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl)carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, or the like, or combinations comprising at least one of the foregoing carbonic acid diesters. The preferred carbonic acid diester is diphenyl carbonate.

Preferably, the number average molecular weight of the polycarbonate is about 3,000 to about 1,000,000 grams/mole (g/mole). Within this range, it is desirable to have a number average molecular weight of greater than or equal to about 10,000, preferably greater than or equal to about 20,000 g/mole, and more preferably greater than or equal to about 25,000 g/mole. Also desirable is a number average molecular weight of less than or equal to about 100,000, preferably less than or equal to about 75,000, more preferably less than or equal to about 50,000 g/mole, and most preferably less than or equal to about 35,0000 g/mole.

Cycloaliphatic polyesters suitable for use in the outer, intermediate and/or first layers are those that are characterized by optical transparency, improved weatherability, chemical resistance, and low water absorption. Cycloaliphatic polyesters are generally prepared by reaction of a diol with a dibasic acid or derivative. The diols useful in the preparation of the cycloaliphatic polyester resins for use as the high quality optical films are straight chain, branched, or cycloaliphatic, preferably straight chain or branched alkane diols, and may contain from 2 to 12 carbon atoms.

Suitable examples of diols include ethylene glycol, propylene glycol, i.e., 1,2- and 1,3-propylene glycol; butane diol, i.e., 1,3- and 1,4-butane diol; diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, and mixtures of any of the foregoing. Particularly preferred is dimethanol bicyclo octane, dimethanol decalin, a cycloaliphatic diol or chemical equivalents thereof and particularly 1,4-cyclohexane dimethanol or its chemical equivalents. If 1,4-cyclohexane dimethanol is to be used as the diol component, it is generally preferred to use a mixture of cis- to trans-isomers in ratios of about 1:4 to about 4:1. Within this range, it is generally desired to use a ratio of cis- to trans-isomers of about 1:3.

The diacids useful in the preparation of the cycloaliphatic polyester resins are aliphatic diacids that include carboxylic acids having two carboxyl groups each of which are attached to a saturated carbon in a saturated ring. Suitable examples of cycloaliphatic acids include decahydro naphthalene dicarboxylic acid, norbornene dicarboxylic acids, bicyclo octane dicarboxylic acids. Preferred cycloaliphatic diacids are 1,4-cyclohexanedicarboxylic acid and trans-1,4-cyclohexanedicarboxylic acids. Linear aliphatic diacids are also useful when the polyester has at least one monomer containing a cycloaliphatic ring. Illustrative examples of linear aliphatic diacids are succinic acid, adipic acid, dimethyl succinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid or naphthalenic acid in a suitable solvent, water or acetic acid at room temperature and at atmospheric pressure using suitable catalysts such as rhodium supported on a suitable carrier of carbon or alumina. They may also be prepared by the use of an inert liquid medium wherein an acid is at least partially soluble under reaction conditions and a catalyst of palladium or ruthenium in carbon or silica is used.

Typically, during hydrogenation, two or more isomers are obtained wherein the carboxylic acid groups are in either the cis- or trans-positions. The cis- and trans-isomers can be separated by crystallization with or without a solvent, for example, n-heptane, or by distillation. While the cis-isomer tends to blend better, the trans-isomer has higher melting and crystallization temperature and is generally preferred. Mixtures of the cis- and trans-isomers may also be used, and preferably when such a mixture is used, the trans-isomer will preferably comprise at least about 75 wt % and the cis-isomer will comprise the remainder based on the total weight of cis- and trans-isomers combined. When a mixture of isomers or more than one diacid is used, a copolyester or a mixture of two polyesters may be used as the cycloaliphatic polyester resin.

Chemical equivalents of these diacids including esters may also be used in the preparation of the cycloaliphatic polyesters. Suitable examples of the chemical equivalents of the diacids are alkyl esters, e.g., dialkyl esters, diaryl esters, anhydrides, acid chlorides, acid bromides, or the like, or combinations comprising at least one of the foregoing chemical equivalents. The preferred chemical equivalents comprise the dialkyl esters of the cycloaliphatic diacids, and the most preferred chemical equivalent comprises the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, wherein two isomers having the carboxylic acid groups in the cis- and trans-positions are obtained. The isomers can be separated, the trans-isomer being especially preferred. Mixtures of the isomers may also be used as detailed above.

The polyester resins are generally obtained through the condensation or ester interchange polymerization of the diol or diol chemical equivalent component with the diacid or diacid chemical equivalent component and having recurring units of the formula (VII):

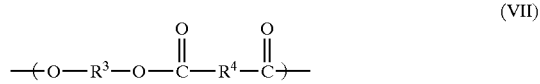

(VII)

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^4$ is an alkyl or a cycloaliphatic radical which is the decarboxylated residue derived from a diacid, with the proviso that at least one of $R^3$ or $R^4$ is a cycloalkyl group.

A preferred cycloaliphatic polyester is poly(1,4-cyclohexanedimethanol-1,4-cyclohexanedicarboxylate) having recurring units of formula (VIII)

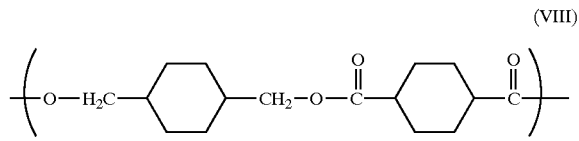

(VIII)

wherein in the formula (VII), $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester resins can be generally made in the presence of a suitable catalyst such as a tetra(2-ethyl hexyl)titanate, in a suitable amount, typically about 50 to 400 ppm of titanium based upon the total weight of the final product.

Poly(1,4-cyclohexanedimethanol-1,4-cyclohexanedicarboxylate) generally forms a suitable blend with the polycarbonate. In addition, a layer manufactured from poly(1,4-cyclohexanedimethanol-1,4-cyclohexanedicarboxylate) generally shows excellent adhesion to as layer manufactured from polycarbonate or blends of polycarbonate with other thermoplastics, without the use of a primer.

In one embodiment the polymeric resins used in the first, second and intermediate layers comprise block copolyestercarbonates, which comprise alternating carbonate and arylate blocks. They include polymers comprising structural units of the formula:

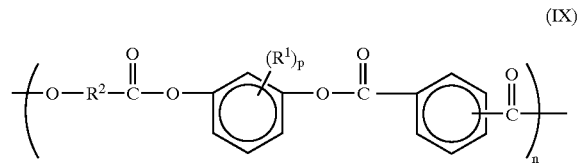

(IX)

wherein each $R^1$ is independently halogen or $C_{1-12}$ alkyl, p is about 0 to about 3, each $R^2$ is independently a divalent organic radical, m is at least 1 and n is at least about 4. Preferably n is at least about 10, more preferably at least about 20 and most preferably about 30 to about 150. Preferably m is at least about 3, more preferably at least about 10 and most preferably about 20 to about 200. In especially preferred embodiments m is present in an amount of about 20 and 50. It may also be desirable to use alternating carbonate and arylate block copolymers in the first, second and intermediate layers. As defined herein "alternating carbonate and arylate blocks" means that the copolyestercarbonates comprise at least one carbonate block and at least one arylate block.

The arylate blocks contain structural units comprising 1,3-dihydroxybenzene moieties which may be unsubstituted or substituted. Alkyl substituents, if present, are preferably straight-chain or branched alkyl groups, and are most often located in the ortho position to both oxygen atoms although other ring locations may also be used. Examples of $C_{1-12}$ alkyl groups are methyl, ethyl, n-propyl, isopropyl, butyl, iso-butyl, t-butyl, nonyl, decyl, and aryl-substituted alkyl, including benzyl, with methyl being particularly preferred. Examples of halogen substituents are bromo, chloro, and fluoro. 1,3-dihydroxybenzene moieties containing a mixture of alkyl and halogen substituents are also suitable. The value for p may be 0 to about 3, preferably 0 to about 2, and more preferably 0 to about 1. A preferred 1,3-dihydroxybenzene moiety is 2-methylresorcinol. The most preferred 1,3-dihydroxybenzene moiety is unsubstituted resorcinol in which p is zero. Polymers containing mixtures of 1,3-dihydroxybenzene moieties, such as a mixture of unsubstituted resorcinol with 2-methylresorcinol are also contemplated.

In the arylate structural units the 1,3-dihydroxybenzene moieties are bound to aromatic dicarboxylic acid moieties which may be monocyclic moieties, such as isophthalate or terephthalate or their chlorine-substituted derivatives; or polycyclic moieties, such as biphenyl dicarboxylate, diphenylether dicarboxylate, diphenylsulfone dicarboxylate, diphenylketone dicarboxylate, diphenylsulfide dicarboxylate, or naphthalenedicarboxylate, preferably naphthalene-2,6-dicarboxylate; or mixtures of monocyclic and/or polycyclic aromatic dicarboxylates. Preferably, the aromatic dicarboxylic acid moieties are isophthalate and/or terephthalate. Either or both of the isophthalate and/or terephthalate moieties may be present if desired. It is generally desirable to have both moieties present in a molar ratio of isophthalate to terephthalate in the range of about 0.25:0.1 to about 4.0:1. When the isophthalate to terephthalate ratio is greater than about 4.0:1, then unacceptable levels of cyclic oligomer may form. When the isophthalate to terephthalate ratio is less than about 0.25:1, then unacceptable levels of insoluble polymer may form. Preferably the molar ratio of isophthalate to terephthalate is about 0.4:1 to about 2.5:1, and more preferably about 0.67:1 to about 1.5:1.

In the carbonate blocks, each $R^2$ is independently an organic radical derived from a dihydroxy compound. It is generally desirable to have at least about 60 mole percent of the total number of $R^2$ groups in the polymer as aromatic organic radicals with the balance being aliphatic, alicyclic, or aromatic radicals. Suitable $R^2$ radicals include m-phenylene, p-phenylene, 4,4'-biphenylene, 4,4'-bi(3,5-dimethyl)-phenylene, 2,2-bis(4-phenylene)propane, or the like, or combinations comprising at least one of the foregoing radicals.

BPA polycarbonates and copolyestercarbonates are generally preferred for the first, intermediate and the second layer of the silver multilayered film. Blends and copolymers of poly(1,4-cyclohexane-dimethanol-1,4-cyclohexanedicarboxylate) and polycarbonates may also be used in the first, intermediate and the second layer of the silver multilayered film. Such blends and copolymers exhibit excellent primerless adhesion to a polycarbonate layer when a layer comprising the blend is bonded to the polycarbonate layer by lamination, hot pressing, molding (in mold decoration), melt extrusion, coextrusion of both resins, or other similar bonding or joining techniques.

When a blend of a polycarbonate and a polyester or a copolymer such as a copolyestercarbonate is used in a given layer of the silver multilayered film, it is generally desirable for the blend to have a melt volume rate of greater than or equal to about 1 cubic centimeters/10 minutes (cc/10 min or ml/10 min) to less than or equal to about 150 cubic centimeters/10 minutes when measured at 300° C., at a load of 2.16 kilograms and a four minute dwell time. Within this range, it is generally desirable to have a melt volume rate of greater than or equal to about 4, preferably greater than or equal to about 9, and more preferably greater than or equal to about 10 cc/10 min, when measured at 300° C., at a load of 2.16 kilograms and a four minute dwell time. Also desirable within this range is a melt volume rate of less than or equal to about 100, preferably less than or equal to about 50, and more preferably less than or equal to about 20 cc/10 minutes.

When a thermoplastic resin blend is used in a given layer, the resins may be blended in any desired suitable ratio. Binary blends, ternary blends, and blends having more than three resins may also be used in a given layer. When a binary blend or ternary blend is used in the polymeric alloy, one of the polymeric resins in the alloy may comprise about 1 to about 99 weight percent (wt %) based on the total weight of the composition. Within this range, it is generally desirable to have at least one of the polymeric resins in an amount greater than or equal to about 20, preferably greater than or equal to about 30 and more preferably greater than or equal to about 40 wt %, based on the total weight of the composition for a given layer. Also desirable within this range, is an amount of less than or equal to about 90, preferably less than or equal to about 80 and more preferably less than or equal to about 60 wt % based on the total weight of the composition for a given layer. When ternary blends of blends having more than three polymeric resins are used, the various polymeric resins may be present in any desirable weight ratio.

As stated above, the silver multilayered film generally has a first, and intermediate and a second layer. The second layer generally does not contain any fillers or flakes. It may optionally comprise an ultraviolet (UV) absorber to improve the weatherability of the silver multilayered film. Ultraviolet light absorbers are generally used to improve the light stability of the resin. The UV light absorbers that may be used are those that are generally compatible with polycarbonates. Suitable examples are benzotriazoles, benzophenones, triazines, cyanoacrylates, dibenzoylresorcinols, and oxanilide based UV absorbers. Suitable specific examples of ultraviolet radiation absorbing compounds include 2-(benzotriazol-2-yl)-4-(1,1,3,3-tetramethylbutyl)phenol, 2-(benzotriazol-2-yl)-4-methylphenol, 2-hydroxy-4-octyloxy benzophenone, 2-hydroxy-4-methoxybenzophenone, ethyl-2,2-diphenyl-1-cyanoacrylate, 2'-ethylhexyl-2,2-diphenyl-1-cyanoacrylate, 2-(2'-hydroxy-4'-octyloxy)bis-4,6-(2',4'-dimethylphenyl) triazine, 2-ethyl-2'-ethoxy oxalanide, bis [2-hydroxy-5-methyl-3-(benzotriazol-2-yl)phenyl]-methane, bis[2-hydroxy-5-t-octyl-3-(benzotriazol-2-yl)phenyl]methane, 2,2'-(1,4-phenylene)bis [4H-3,1-benzoxazin-4-one], and 2-(2'-hydroxy-4-hexyloxy)-4,6-diphenyltriazine.

The UV absorbers are generally incorporated into the polymeric resin in an amount of about 0.05 to about 15 wt % based on the total weight of the second layer. Within this range, it is generally desirable to have the UV absorber present in an amount of greater than or equal to about 0.1, preferably greater than or equal to about 0.2 and more preferably greater than or equal to about 0.3 wt % based on the total composition of the second layer. Within this range, it is generally desirable to have the UV absorber present in an amount of less than or equal to about 10 wt %, preferably less than or equal to about 8 wt % and more preferably less than or equal to about 5 wt % based on the total composition of the second layer. In addition to UV absorbers, hindered amine light stabilizers (HALS) also contribute to increased weatherability of the structure and may therefore be added to the second layer if desired.

It is generally desirable for the second layer of the silver multilayered film to have a thickness of about 25 micrometers to about 2500 micrometers. Within this range, it is generally desirable for the thickness to be greater than or equal to about 35 micrometers, preferably greater than or equal to about 40 micrometers, and more preferably greater than or equal to about 60 micrometers. Also desirable, within this range, is a thickness of less than or equal to about 2,300 micrometers, preferably less than or equal to about 2,000 micrometers, and more preferably less than or equal to about 1,800 micrometers.

It is generally desirable for the resin used in the second layer to have a melt volume rate of greater than or equal to about 1 cubic centimeters/10 minutes (cc/10 min or ml/10 min) to less than or equal to about 150 cubic centimeters/10 minutes when measured at 300° C., at a load of 2.16 kilograms and a four minute dwell time. Within this range, it is generally desirable to have a melt volume rate of greater than or equal to about 4, preferably greater than or equal to about 9, and more preferably greater than or equal to about 10 cc/10 min, when measured at 300° C., at a load of 2.16 kilograms and a four minute dwell time. Also desirable within this range is a melt volume rate of less than or equal to about 100, preferably less than or equal to about 50, and more preferably less than or equal to about 20 cc/10 minutes.

Preferred thermoplastic resins for the second layer are polycarbonates, polyesters, blends of polycarbonates with polyesters and copolymers of polycarbonates with polyesters such as copolyestercarbonates. In an exemplary embodiment, it is generally desirable for the surface of the second layer that is in contact with the ambient atmosphere to have a class A finish.

The intermediate layer generally comprises a flake composition that imparts to the film at least a portion of its silver coloring. It is generally desirable for the individual flakes of the flake composition to have a reflection spectra (in visible light) that is identical to silver. It is also generally desirable for the individual flakes to be flat (i.e., have a two dimensional geometry) and to have shapes that may be platelet-like, ellipsoidal, square, rectangular, or the like, or combinations comprising at least one of the foregoing shapes.

In one embodiment, the flake composition comprises metallic flakes such as those obtained from titanium, silver, stainless steel, or the like, or combinations comprising at least one of the foregoing and may also be used in the intermediate layers. The metallic flakes may also be coated with a reinforcing coating if desired. In another embodiment, the flake compositions comprises plate like minerals and/or clays such as mica, coated glass, or the like, that are coated with a reinforcing coating to prevent deformation such as bending and folding of the flake during processing. The reinforcing coating generally comprises a metallic oxide such as titania, silica, alumina, or the like, or combinations comprising at least one of the foregoing metallic oxides. Other suitable reinforcing coatings are metallic coatings such as silver, titanium, palladium, aluminum, or the like, or combinations comprising at least one of the foregoing metallic coatings. The metallic and/or metallic oxide coating may be applied to the flakes by processes such as chemical vapor deposition, plasma deposition, spray painting, electrostatic spray painting, or the like. The preferred flakes are mica flakes coated with titania. In one exemplary embodiment, in order to attain a metallic silver finish, it is desirable to add aluminum flakes to the intermediate layer in addition to the mica flakes coated with titania and one or more colorants.

It is generally desirable for the reinforcing coating on the flakes to have an average thickness of about 0.1 to about 10 micrometers prior to processing. Within this range, it is generally desirable to have a reinforcing coating having an average thickness of greater than or equal to about 1, preferably greater than or equal to about 2, and more preferably greater than or equal to about 5 micrometers. Also desirable within this range is a reinforcing coating having an average thickness of less than or equal to about 9, preferably less than or equal to about 8 and more preferably less than or equal to about 7 micrometers.

In one embodiment, it is generally desirable for these flakes to have an aspect ratio of about 2 to about 10,000 prior to processing. Within the range of aspect ratios indicated above, it is generally desirable to have flakes with an aspect ratio of greater than or equal to about 50, preferably greater than or equal to about 70 and more preferably greater than or equal to about 100 before processing. Also desirable are flakes having aspect ratios of less than or equal to about 7,500, preferably less than or equal to about 5,000, and more preferably less than or equal to about 1,000 before processing.

In one embodiment related to the flake size, it is generally desirable to use flakes having a maximum particle size of about 5 to about 250 micrometers prior to processing. Within this range, it is generally desirable to use particles having sizes greater than or equal to about 15, preferably greater than or equal to about 30 and more preferably greater than or equal to about 40 micrometers. Also desirable within this range is a particle size of less than or equal to about 225 micrometers, preferably less than or equal to about 200 micrometers, and more preferably less than or equal to about 180 micrometers.

In an exemplary embodiment related to the particle size prior to processing, it may be desirable to use flakes having at least a bimodal distribution of particle sizes. It is generally preferred to use flakes in the intermediate layer that have a trimodal distribution of particle sizes. A suitable example of a trimodal distribution of particle sizes are a first set of particles having sizes of about 10 to about 60 micrometers, a second set of particles having sizes of about 20 to about 100 micrometers and a third set of particles having sizes of about 20 to about 180 micrometers. Without being limited to theory it is believed that a trimodal distribution of particles facilitates a change in lightness as a function of viewing angle of greater than or equal to about 50 as well as lightness of greater than or equal to about 60.

Figure 2:
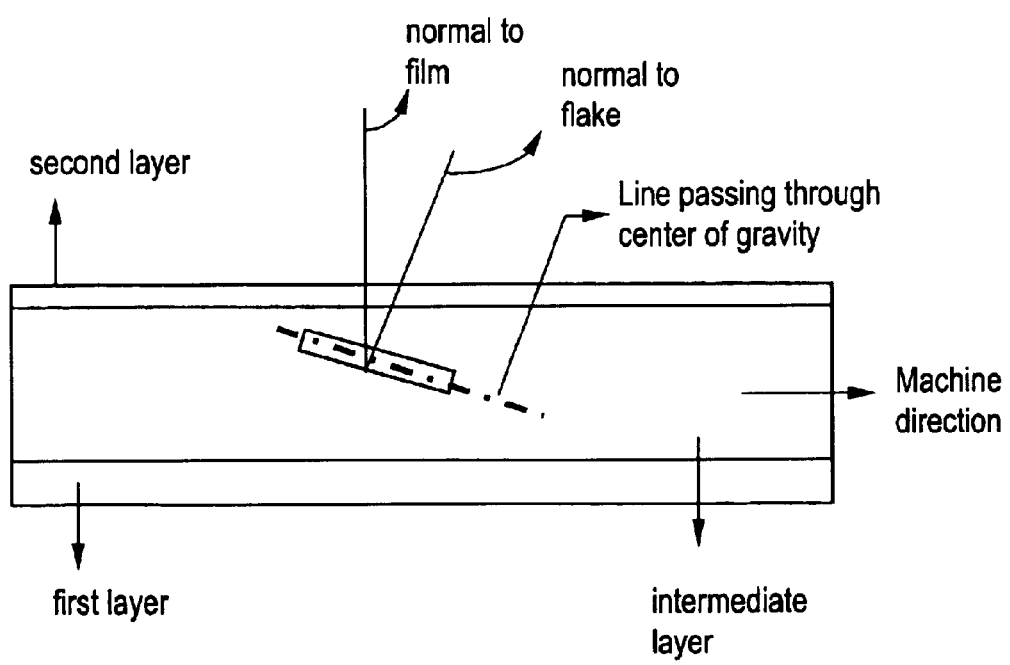
FIG. 2 is a schematic depiction of how the orientation (θ) of an individual flake is measured.

In order to achieve a silver multilayered film, it is generally desirable to have the average orientation of the flakes in an amount of about 0 degrees to about 75 degrees with respect to a normal to the film. Within this range, the average orientation is generally greater than or equal to about 0.1 degrees, and preferably greater than or equal to about 1 degrees, with respect to a normal of the film. Also desirable within this range is an average orientation of less than or equal to about 50 degrees, preferably less than or equal to about 25 degrees, and more preferably less than or equal to about 10 degrees with respect to the normal to the film. The orientation is expressed as the angle between a normal to a line passing through the center of gravity of the flake wherein the line is substantially parallel to the largest edge of the flake and a normal to the film. FIG. 2 is a schematic depicting how the orientation ($\theta$) of an individual flake is measured. The normal to the film is generally the same as a normal to the machine direction, wherein the machine direction is the direction of production of the film.

The flakes are generally present in the intermediate layer an amount of about 0.5 to about 20 wt % based on the total weight of the intermediate layer. Within this range, it is generally desirable to have the flakes present in an amount of greater than or equal to about 2, preferably greater than or equal to about 3 and more preferably greater than or equal to about 4 wt % based on the total weight of the intermediate layer. Also desirable within this range, is an amount of less than or equal to about 15, preferably less than or equal to about 10 and more preferably less than or equal to about 8 wt % based on the total weight of the intermediate layer.

The intermediate layer also contains a small amount of a colorant composition. The colorant composition may comprise colorants such a dyes, pigments, black powders such as carbon black, coke, carbon nanotubes such as single wall carbon nanotubes, multiwall carbon nanotubes or vapor grown carbon fibers. The dyes and pigments utilized may have colors such as blue, dark blue, gray, dark gray, red, dark green, or the like, or combinations comprising at least one of the foregoing colors.

Suitable carbon blacks are those having average particle sizes less than about 200 nanometers (nm), preferably less than about 100 nm, preferably less than about 50 nm, and more preferably less than or equal to about 20 nm. Preferred conductive carbon blacks may also have surface areas greater than about 200 square meter per gram ($m^2/g$), preferably greater than about 400 $m^2/g$, yet more preferably greater than about 1000 $m^2/g$. Preferred conductive carbon blacks may have a pore volume (dibutyl phthalate absorption) greater than about 40 cubic centimeters per hundred grams ($cm^3/100$ g), preferably greater than about 100 $cm^3/100$ g, more preferably greater than about 150 $cm^3/100$ g. The carbon black preferably has low ionic content (chlorides, sulfates, phosphates, fluorides, and nitrates) of about 4 parts per million per gram (ppm/g) or less, with about 2 ppm/g or less more preferred, about 1 ppm/g or less even more preferred, and about 0.5 ppm/g or less especially preferred. Exemplary carbon powders include the carbon black commercially available from Columbian Chemicals under the trade name CONDUCTEX®; the acetylene black available from Chevron Chemical, under the trade names S.C.F. (Super Conductive Furnace) and E.C.F. (Electric Conductive Furnace); the carbon blacks available from Cabot Corp. under the trade names VULCAN XC72® and BLACK PEARLS®; and the carbon blacks commercially available from Akzo Co. Ltd under the trade names KELTJEN BLACK EC 300® and EC 600®.

Single wall carbon nanotubes (SWNTs) may also be used as a colorant in the intermediate layer and these may be produced by laser-evaporation of graphite or carbon arc synthesis. These SWNTs generally have a single wall with outer diameters of about 0.7 to about 2.4 nm. SWNTs having aspect ratios of greater than or equal to about 5, preferably greater than or equal to about 100, more preferably greater than or equal to about 1000 (prior to processing) are generally utilized in the compositions. While the SWNTs are generally closed structures having hemispherical caps at each end of the respective tubes, it is envisioned that SWNTs having a single open end or both open ends may also be used. The SWNTs generally comprise a central portion, which is hollow, but may be filled with amorphous carbon.

Multiwall carbon nanotubes (MWNT's) having multiple, concentrically arranged walls may also be used as a colorant in the intermediate layer. MWNTs generally have a tube diameter of about 2 to about 50 nm and are also produced by the laser-evaporation of graphite or carbon arc synthesis. When MWNTs are used, it is preferred to have an average aspect ratio greater than or equal to about 5, preferably greater than or equal to about 100, more preferably greater than or equal to about 1000 (prior to processing).

Graphitic or partially graphitic vapor grown carbon fibers (VGCF) having "tree-ring" or "fishbone" structures with diameters of about 3.5 to about 2000 nanometers (nm) and aspect ratios greater than or equal to about 5 may also be used as a colorant in the intermediate layer. When VGCF are used diameters of about 3.5 to about 70 nm are preferred. Within this range it is generally desirable to use VGCF having a diameter of less than or equal to about 50, preferably less than or equal to about 30, and more preferably less than or equal to about 20 nm. It is also preferable to have average aspect ratios greater than or equal to about 100 and more preferably greater than or equal to about 1000 (prior to processing). The VGCF may or may not contain embedded catalyst particles utilized in their production.

The a colorant composition is used in the intermediate layer in an amount of about 0.005 wt % to about 10 wt % based on the total weight of the intermediate layer. Within this range, it is generally desirable to use the colorant in an amount of greater than or equal to about 0.009, preferably greater than or equal to about 0.01 wt % based on the total weight of the intermediate layer. Also desirable within this range is an amount of less than or equal to about 5, preferably less than or equal to about 1, and more preferably less than or equal to about 0.1 wt % based on the total weight of the intermediate layer. The preferred colorant composition comprises carbon black.

It is generally desirable for the intermediate layer to have a thickness of about 10 micrometer to about 12,500 micrometers. Within this range, it is generally desirable for the thickness to be greater than or equal to about 20 micrometers, preferably greater than or equal to about 50 micrometers, and more preferably greater than or equal to about 100 micrometers. Also desirable within this range is a thickness of less than or equal to about 10,000 micrometers, preferably less than or equal to about 5,000 micrometers, and more preferably less than or equal to about 500 micrometers.

It is generally desirable to have the resin for the intermediate layer to have a melt volume rate of greater than or equal to about 1 cubic centimeters/10 minutes (cc/10 min or ml/10 min) to less than or equal to about 150 cubic centimeters/10 minutes when measured at 300° C., at a load of 2.16 kilograms and a four minute dwell time. Within this range, it is generally desirable to have a melt volume rate of greater than or equal to about 4, preferably greater than or equal to about 9, and more preferably greater than or equal to about 10 cc/10 min, when measured at 300° C., at a load of 2.16 kilograms and a four minute dwell time. Also desirable within this range is a melt volume rate of less than or equal to about 100, preferably less than or equal to about 50, and more preferably less than or equal to about 20 cc/10 minutes.

Preferred thermoplastic resins for the intermediate layer are polycarbonates, polyesters, blends of polycarbonates with polyesters, and copolymers of polyesters with polycarbonates such as copolyestercarbonates. Preferred flakes are mica flakes coated with titanium dioxide.

The first layer generally comprises a thermoplastic resin and a flake composition in order to reflect any light that has been transmitted through the intermediate layer back towards the second layer as shown in FIG. 3. FIG. 3 is a schematic that depicts the mechanics involved with producing a silver surface finish. FIG. 3($a$) shows that a transparent first layer scatters any incident light that is transmitted through the intermediate layer; this promotes an increase in lightness but reduces the flop. FIG. 3($b$) depicts how a black first layer absorbs all light transmitted through the intermediate layer; this reduces the lightness while maintaining the flop. FIG. 3($c$) depicts how the incorporation of flakes such as titanium dioxide coated mica into the first layer, promotes a reflection of light transmitted through the intermediate layer, which increases lightness and improves the flop.

Preferred thermoplastic resins for the first layer are polycarbonates, polyesters, blends of polycarbonates with polyesters or copolymers of polycarbonates with polyesters such as copolyestercarbonates. The flakes used in the first layer may be the same or different from those used in the intermediate layer. Preferred flakes are mica flakes coated with titanium dioxide.

In order to achieve a silver multilayered film, it is generally desirable to have the average orientation of the flakes in an amount of about 0 degrees to about 75 degrees in the first layer. Within this range, the average orientation is generally greater than or equal to about 0.1 degrees, and preferably greater than or equal to about 1 degrees, with respect to a normal of the film. Also desirable within this range is an average orientation of less than or equal to about 50 degrees, preferably less than or equal to about 25 degrees, and more preferably less than or equal to about 10 degrees with respect to the normal to the film. The orientation of an individual flake in the first layer is defined in the same manner as that for the individual flake in the second layer.

The flakes are generally present in the first layer an amount of about 0.5 to about 20 wt % based on the total weight of the first layer. Within this range, it is generally desirable to have the flakes present in an amount of greater than or equal to about 2, preferably greater than or equal to about 3 and more preferably greater than or equal to about 4 wt % based on the total weight of the first layer. Also desirable within this range, is an amount of less than or equal to about 15, preferably less than or equal to about 10 and more preferably less than or equal to about 8 wt % based on the total weight of the first layer.

The first layer may also optionally contain reinforcing fillers such as fibrous fillers. When present, the fibrous filler is selected from those that will impart improved physical properties to silver multilayered film. It is generally desirable to use fillers that have an aspect ratio greater than 1. As used herein, "fibrous" fillers may therefore exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 may be used. Examples of such fillers include those described in "Plastic Additives Handbook, 5$^{th}$ Edition" Hans Zweifel, Ed, Carl Hanser Verlag Publishers, Munich, 2001. Non-limiting examples of suitable fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among fibrous fillers are single crystal fibers or "whiskers" including silicon carbide, alumina, boron carbide, iron, nickel, copper. Fibrous fillers such as glass fibers, basalt fibers, including textile glass fibers and quartz may also be included.

Also included are natural organic fibers including wood flour obtained by pulverizing wood, and fibrous products such as cellulose, cotton, sisal, jute, cloth, hemp cloth, felt, and natural cellulosic fabrics such as Kraft paper, cotton paper and glass fiber containing paper, starch, cork flour, lignin, ground nut shells, corn, rice grain husks and mixtures comprising at least one of the foregoing.

In addition, organic reinforcing fibrous fillers and synthetic reinforcing fibers may be used. This includes organic polymers capable of forming fibers such as polyethylene terephthalate, polybutylene terephthalate and other polyesters, polyarylates, polyethylene, polyvinylalcohol, polytetrafluoroethylene, acrylic resins, high tenacity fibers with high thermal stability including aromatic polyamides, polyaramid fibers such as those commercially available from Du Pont de Nemours under the trade name KEVLAR®, polybenzimidazole, polyimide fibers such as those available from Dow Chemical Co. under the trade names POLYIMIDE 2080% and PBZ® fiber, polyphenylene sulfide, polyether ether ketone, polyimide, polybenzoxazole, aromatic polyimides or polyetherimides, and the like. Combinations of any of the foregoing fibers may also be used.

Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods of fiber manufacture. Typical cowoven structures include glass fiber-carbon fiber, carbon fiber-aromatic polyimide (aramid) fiber, and aromatic polyimide fiber-glass fiber. Fibrous fillers may be supplied in the form of, for example, rovings, woven fibrous reinforcements, such as 0–90 degree fabrics, non-woven fibrous reinforcements such as continuous strand mat, chopped strand mat, tissues, papers and felts and 3-dimensionally woven reinforcements, performs and braids.

In an exemplary embodiment, glass fibers are used as the non-conductive fibrous fillers to improve conductivity in these applications. Useful glass fibers can be formed from any type of fiberizable glass composition and include those prepared from fiberizable glass compositions generally termed as "E-glass," "A-glass," "C-glass," "D-glass," "R-glass," "S-glass," as well as E-glass derivatives that are fluorine-free and/or boron-free. Most reinforcement mats comprise glass fibers formed from E-glass. Commercially produced glass fibers generally having nominal filament diameters of about 4.0 to about 35.0 micrometers, and most commonly produced E-glass fibers having nominal filament diameters of about 9.0 to about 30.0 micrometers may be included in the conductive compositions.

In general it is desirable to add the fibrous fillers to the first layer in an amount of up to about 50 wt % based on the total weight of the first layer. Within this range an amount of fibrous filler of less than or equal to about 30 wt %, preferably less than or equal to about 20 wt %, and more preferably less than or equal to about 15 wt % is generally used In order to produce the silver multilayered film, it is generally desirable to use deforming forces such as shear, compressive and/or elongational forces. Processes such as extrusion, co-extrusion, roll milling, ultradrawing, or the like, or combinations comprising at least one of the foregoing processes may be used to produce the respective layers used in the production of the silver multilayered film. In the processing of the intermediate and first layers it is generally desirable to process the layers in a manner effective to achieve orientation of the flakes during the processing. This orientation of the flakes in the intermediate or first layers may be achieved by a one step process such as extrusion or alternatively it may be achieved in multiple steps such as extrusion followed by ultradrawing.

When ultradrawing is used to facilitate orientation of the flakes in the intermediate and the first layers, it is generally desirable to use draw ratios of about 2 to about 100. Within this range a draw ratio of greater than or equal to about 3, preferably greater than or equal to about 5, and more preferably greater than or equal to about 10 is useful. Similarly a draw ratio of less than or equal to about 50, preferably less than or equal to about 20, and more preferably less than or equal to about 10 is generally desirable.

The films may be bonded to one another by processes such as hot rolling in a two or three roll mill. In one method of processing the silver multilayered film, the first, intermediate and second layers may be coextruded and adhered to each other by passing through a roll mill at a temperature effective to facilitate bonding of the respective layers to one another. In another method of processing, the respective layers may be preheated using either convectional heating, or radiation based heating such as microwave or radio frequency heating, before bonding the respective layers in a roll mill. It may also be desirable to orient the flakes during the preheating by ultradrawing the respective layers if desired. In yet another method of processing, the respective layers may be bonded together prior to subjecting the film to ultradrawing processes.

In an exemplary embodiment, related to the processing of the silver multilayered film, it is generally desirable to have the intermediate layer disposed on the surface of the first layer and the second layer disposed on the surface of the intermediate layer opposite to the first layer. Additionally, it is generally desirable for the surface of intermediate layer opposite the surface disposed on the first layer to be at a distance of about 25 micrometers to about 1000 micrometers from the surface of the second layer in contact with the ambient air.

In another exemplary embodiment related to the processing of the silver multilayered film, it is desirable for the film to have a lightness greater than or equal to about 60, preferably greater than or equal to about 70, and more preferably greater than or equal to about 80, while having a change of lightness as a function of viewing angle ($\Delta L^*$) greater than or equal to about 40, preferably greater than or equal to about 50, and more preferably greater than or equal to about 60.

Silver multilayered films produced by the above processes may be used in a variety of applications such as automobile exterior panels and interior panels, refrigerator panels, computers, electronic goods such as cell phones, transistors, personal digital assistants, compact disc players, stereo components, food processors and blenders, and the like. The silver multilayered film may generally be bonded to plastic panels or ceramic panels in molding processes such as injection molding, vacuum forming, blow molding, compression molding or it may be bonded to metallic or ceramic panels by using adhesives or via thermoforming processes.

Articles having silver multilayered films are environmentally friendly and can be advantageously reground if desired. The use of such silver multilayered films for finishing the surfaces of commercial articles reduces the production costs and minimizes environmental damage associated with volatile organic solvents that are generally utilized in paints.

The following examples, which are meant to be exemplary, not limiting, illustrate compositions and methods of manufacturing some of the various embodiments of the environmentally resistant coatings using various materials and apparatus.

EXAMPLES

Comparative Example 1

This example was conducted to demonstrate that the flakes having an aspect ratio of about 10 to about 100 are desirable to produce silver multilayered films. In addition it may be shown that the ability to orient the flakes in the intermediate layer is also desirable to produce silver multilayered films. In this experiment, first, second and intermediate layers were all coextruded from polycarbonate. The second layer had a thickness of about 125 to about 250 micrometers and was extruded from a 1 inch single screw extruder. The intermediate layer had a thickness of about 50 micrometers to about 500 micrometers and was extruded from a one and a half (1½) inch single screw extruder. The first layer had a thickness of about 10 to about 1000 micrometers and was extruded from a one and a quarter (1¼) inch single screw extruder. The first layer was maintained as either white (transparent) or black (filled with carbon black) and both of these first layers were used on the silver multilayered film.

The first and intermediate layers are manufactured by feeding the thermoplastic resin and along with the aluminum flakes to the respective extruders. The extruded layers including the outer and the first and the intermediate layers are then calendered together in a three roll mill having both rolls polished. The aluminum flakes was added in an amount of 1 wt % and 5 wt % to the extruder. All weight percents were based on the total weight of the intermediate layer.

Figure 4B:
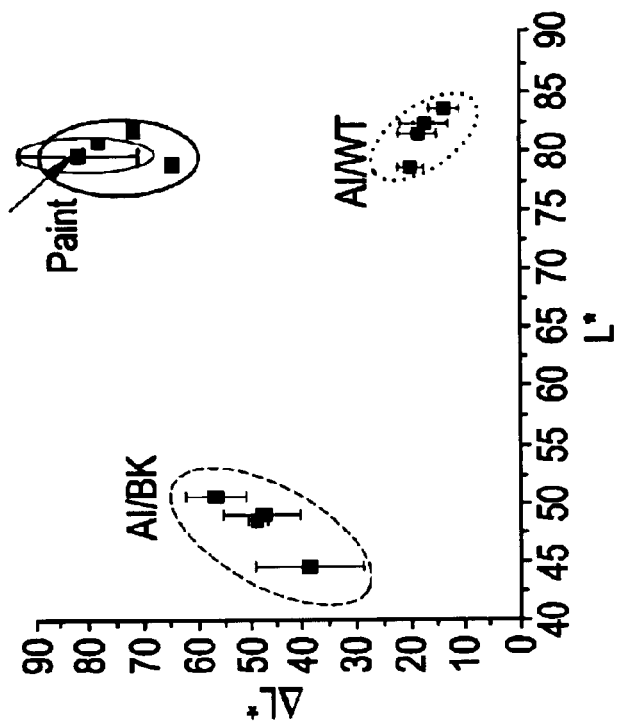
FIGS. 4(a) and (b) are graphical plots showing the (a) lightness (L*) as a function of viewing angle and (b) the change of lightness as a function of viewing angle (ΔL*) versus lightness (L*) respectively for multilayered films having aluminum flakes.
Figure 4A:
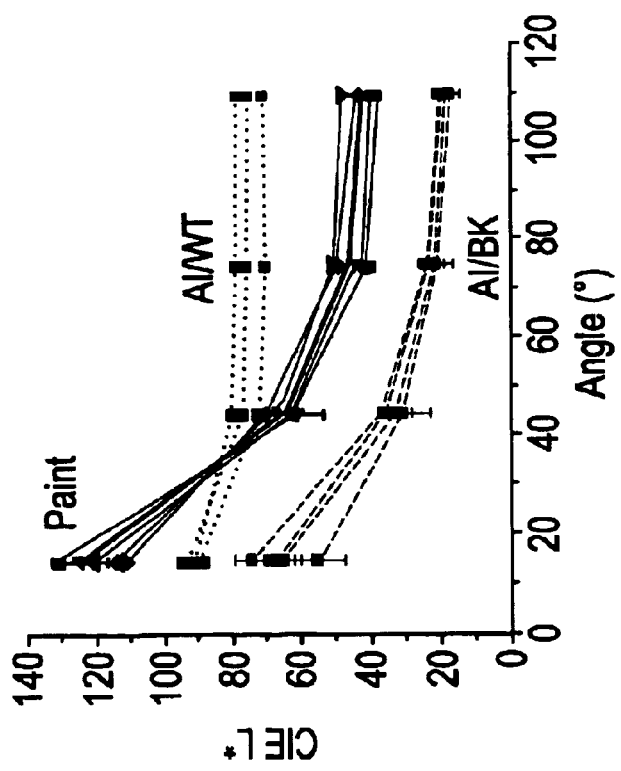

An examination of the film for the appropriate silver finish was conducted using a conventional integrating sphere spectrophotometer manufactured by the Gretag-MacBeth Company for the measurements of lightness (L*) and a bi-directional spectrophotometer manufactured by the Gretag-MacBeth company for measuring (ΔL*) i.e., the change of lightness as a function of viewing angle (also known as the flop). The results for the film are shown in FIGS. 4(a) and (b) respectively. In FIG. 4(a), the results for the lightness are compared with silver paint as a function of viewing angle. From the figure it may be seen that when the intermediate layer containing aluminum flakes is bonded to either the white first layer or the black first layer, the results do not simulate the silver paint. Similarly, the results shown in FIG. 4(b) do not simulate the values for paint. Here it may be seen that while the painted sample displays a high value of flop and a high value of lightness, the film having the black first layer shows a high value of flop and a low value of lightness, while the film having the white first layer shows a high value of lightness and a low value of flop. As stated above, the desired silver multilayered film generally has a high value of flop and a high value of lightness.

Figure 5:
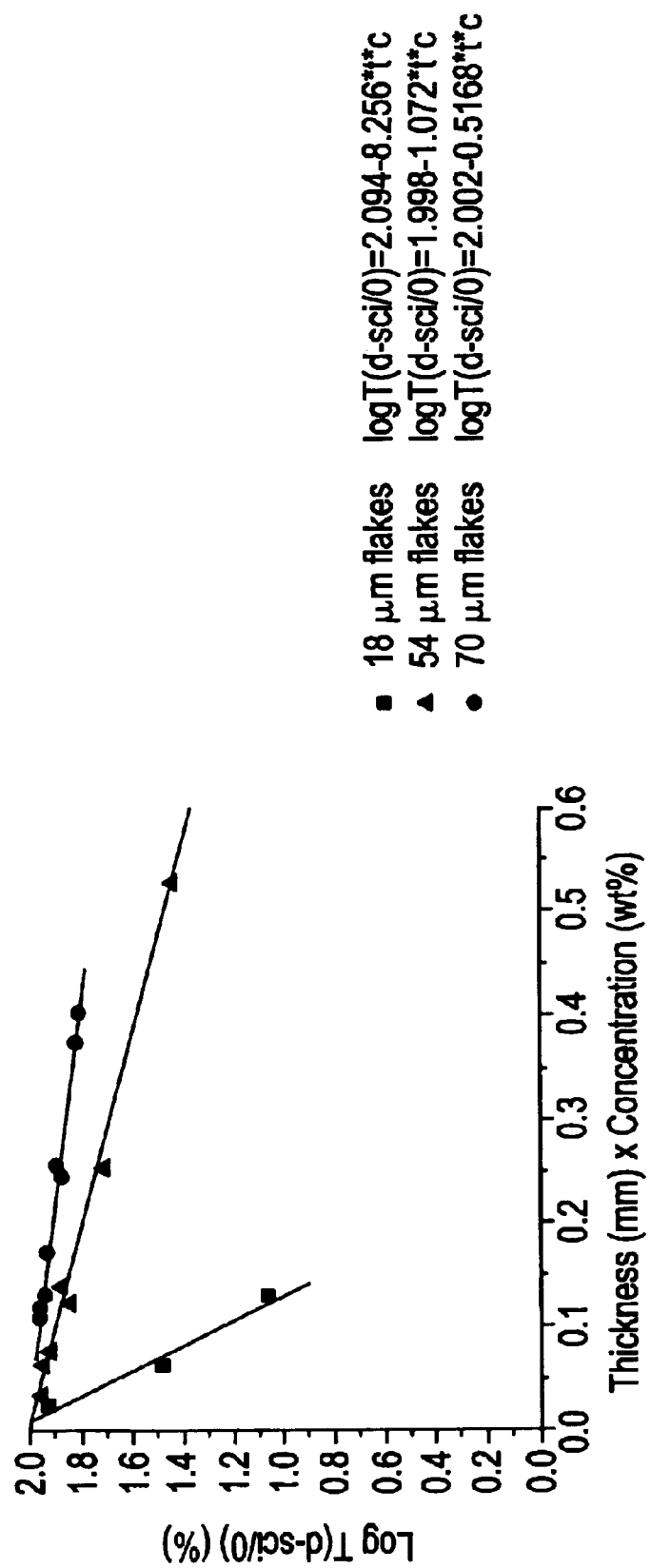
FIG. 5 is a graphical plot of the transmission optical behavior of the multilayered films having aluminum flakes; the plot shows that the optical transmission through the extruded films follows Bear's Law.

An analysis of the reason for the differences between sample painted with silver paint and the films having the aluminum flakes, reveals that the extruded films had very little aluminum flake orientation. As shown in FIG. 5, the transmission optical behavior of these films shows that the optical transmission follows Bear's Law. This data implies that the aluminum flakes in the extruded single polycarbonate layer act as isotropic pigments i.e., the aspect ratio of these flakes has been diminished during processing as a result of folding and bending and this promotes a lack of orientation during processing.

Figure 6B:
FIGS. 6(a) and (b) respectively are transmission electron micrographs depicting the bending and folding of the aluminum flakes contained in the polycarbonate intermediate layer.
Figure 6A:
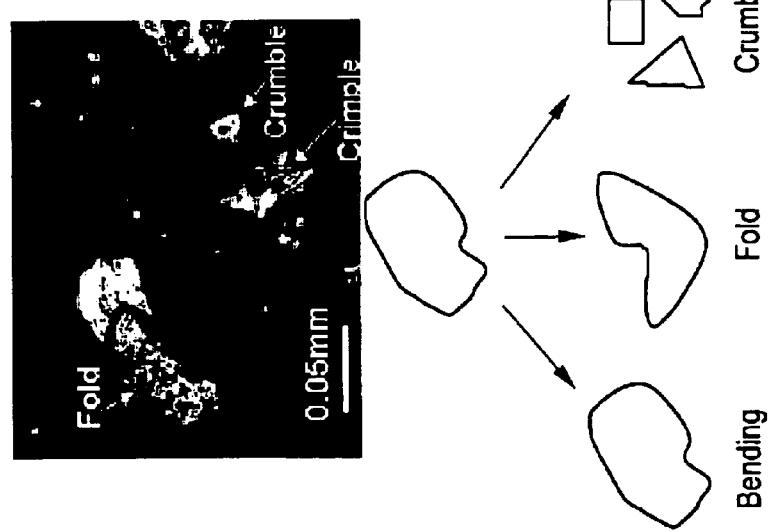

Further evidence of this reduction in aspect ratio was undertaken by using transmission electron microscopy as seen in FIG. 6(a) and (b) respectively. From the micrograph in FIG. 6(a), it is clear that aluminum flakes in the co-extruded silver multilayered film are seen as not flat disks—they are bent or folded flakes. The loss of flat morphology in these aluminum flakes diminishes the optical effect of aluminum flakes. In other words, since surface the reflection from the non-flat aluminum flakes is intrinsically diffused, it is impossible to orient aluminum flakes with non-flat morphology in co-extruded films (transmission electron microscopy in FIG. 6(b) to achieve high lightness (specular reflection) and high flop.

Example 2

Figure 7B:
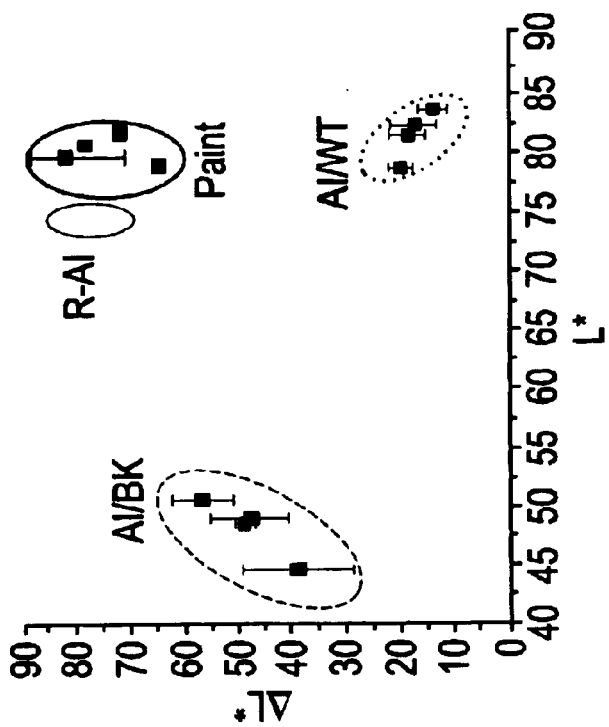
FIGS. 7(a) and (b) are graphical plots showing the (a) lightness (L*) as a function of viewing angle and (b) the change of lightness as a function of viewing angle (ΔL*) versus lightness (L*) respectively for multilayered films having reinforced aluminum flakes.
Figure 7A:
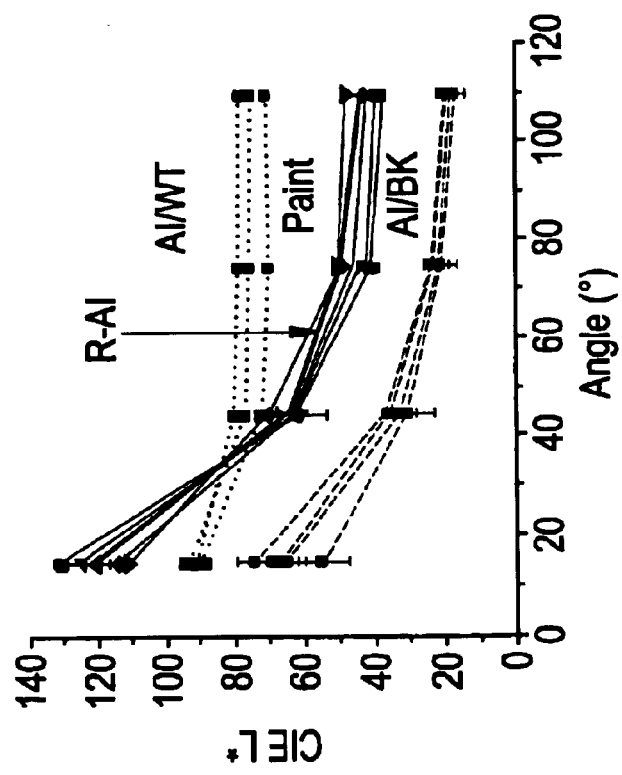
Figure 8A:
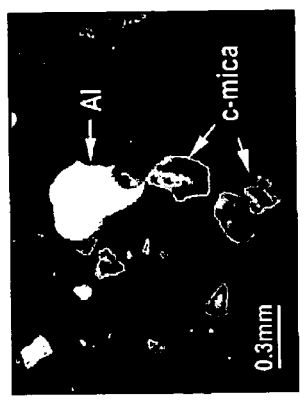
FIGS. 8(a) and (b) are transmission electron micrographs showing that the reinforced aluminum flakes do not suffer as much bending and folding damage as the un-reinforced aluminum flakes.
Figure 8B:
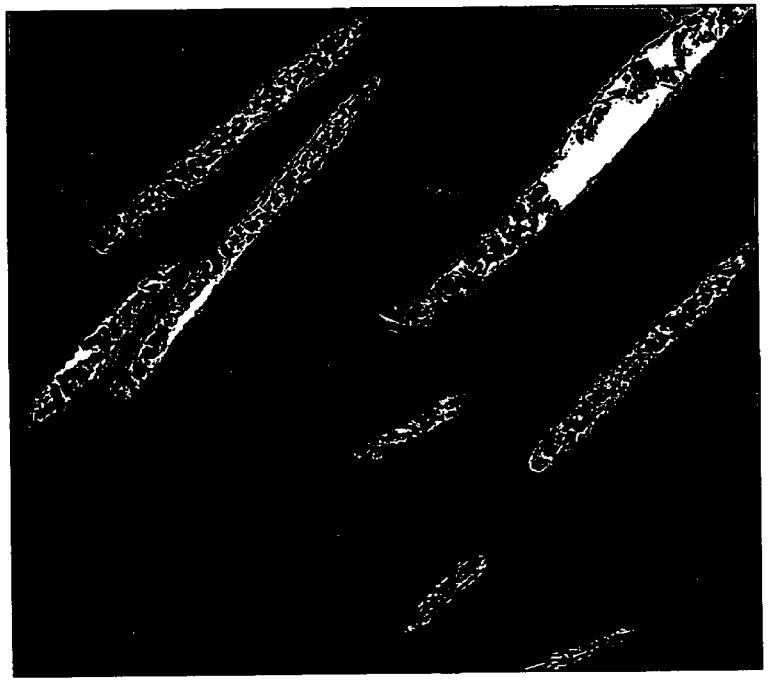

In this example, the aluminum flakes from Example 1 were "reinforced" by coating them with a transparent ceramic (e.g., silica or alumina) so that they were rigid enough to maintain their aspect ratios during melt processing. The reinforced flakes are available commercially from Flex Products Inc and coated using a vacuum deposition process. These reinforced aluminum flakes were processed in polycarbonate in the same manner as detailed in Comparative Example 1. The lightness (L*) and the change of lightness as a function of viewing angle (ΔL*) are shown in the FIGS. 7(a) and (b) respectively. In FIGS. 7(a) and (b) it can be seen that the behavior of the reinforced alumina mimics the behavior of the specimen painted with silver more closely than the un-reinforced aluminum flakes used in Example 1. FIGS. 8(a) and (b) are transmission electron micrographs which show that the reinforced aluminum flakes do not suffer as much damage as the un-reinforced aluminum flakes.

Example 3

In this example, 5.4 wt % mica flakes coated with titania ($TiO_2$), 0.6 wt % aluminum flakes and 0.01 wt % carbon black were added to the intermediate layer in place of the aluminum flakes. All three layers, i.e., the inner, intermediate and the second layers were manufactured from polycarbonate. The three layers were co-extruded in a manner similar to that described in Example 1. The first layer for this example contained 1 wt % mica flakes coated with titania and 0.01 wt % carbon black.

Figure 9A:
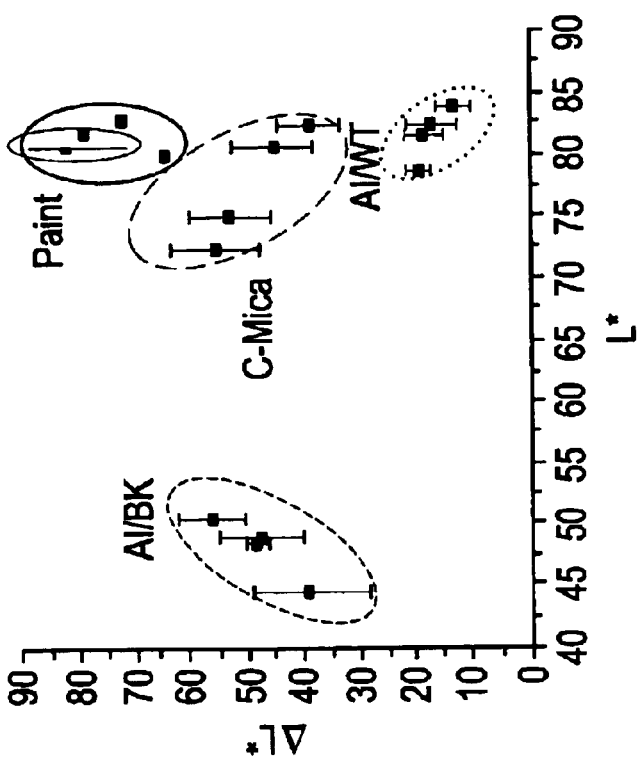
FIGS. 9(a) and (b) are graphical plots showing the (a) lightness (L*) as a function of viewing angle and (b) the change of lightness as a function of viewing angle (ΔL*) versus lightness (L*) respectively for multilayered films containing mica coated with titania.
Figure 9B:
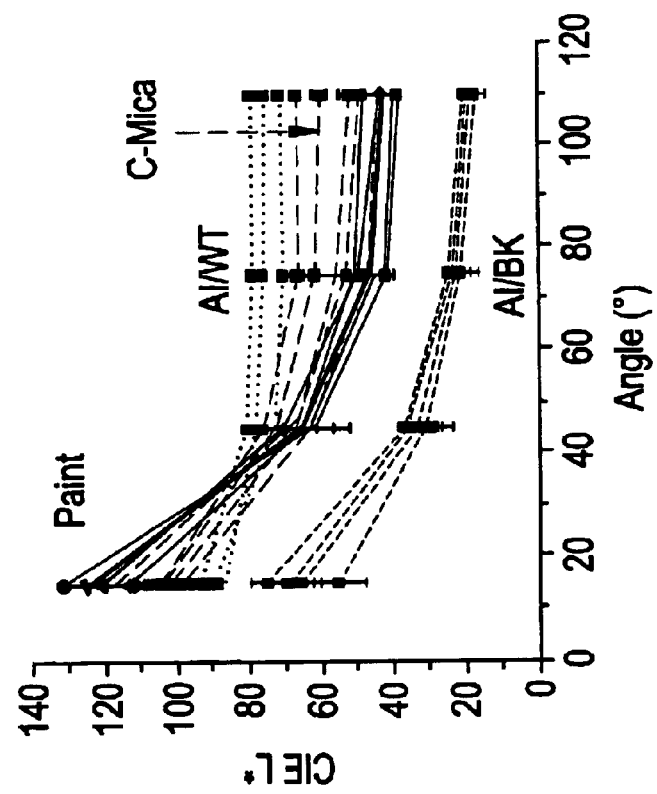

The lightness (L*) and the change of lightness as a function of viewing angle (ΔL*) are shown in the FIGS. 9(a) and (b) respectively. From these plots it can be seen that samples containing the titania reinforced mica show a lightness (L*) and a change of lightness as a function of viewing angle (ΔL*) which is closer to the silver paint than the un-reinforced aluminum flakes. This again indicates that retention of aspect ratio and the consequent orientation of the flakes in the intermediate layer facilitates the development of silver coloring in the multilayered film.

Figure 10B:
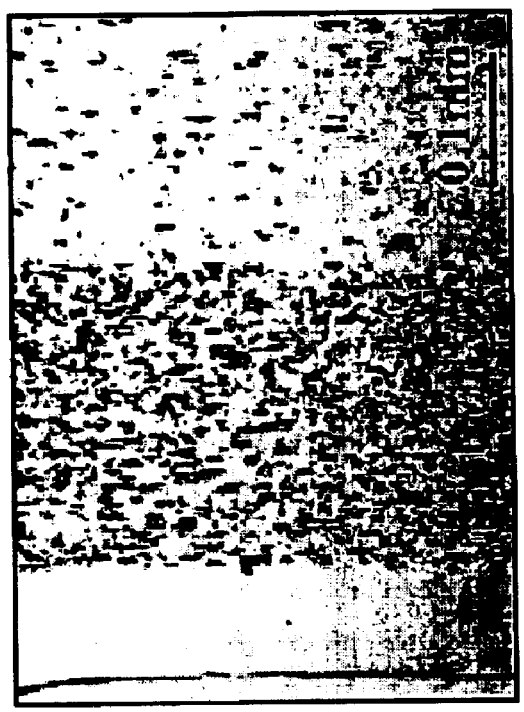
FIGS. 10(a) and (b) are transmission electron micrographs which show flakes of mica coated with titania after coextrusion into a polycarbonate multilayered film.
Figure 10A:
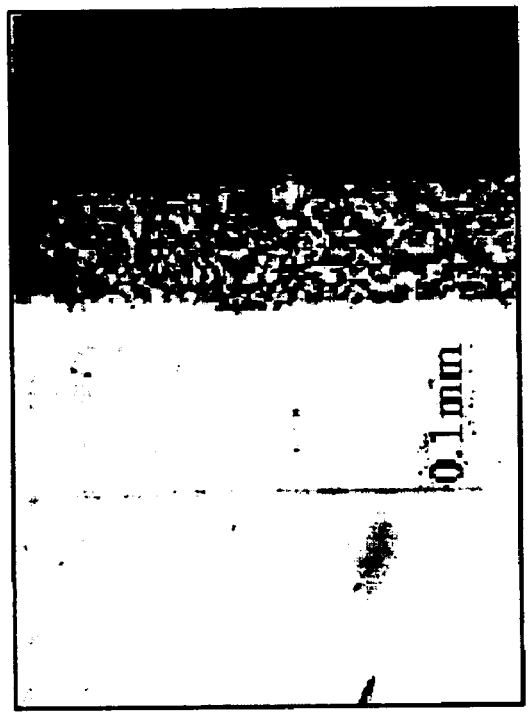

The inherent layered sheet morphology of mica generally indicates that such pigments can preserve their flat morphology. This is depicted in the electron micrographs shown in FIGS. 10(a) and (b) after extrusion. As a result of this preservation of aspect ratio, a strong change of lightness as a function of viewing angle can be expected from these types of flakes. However, in this case, it is generally desirable to obtain the right lightness to match that displayed by silver metal. Because of the interference of light that occurs in the titania coating on the mica flakes, the flakes display different colors. In order to obtain a white coloration from these flakes it is generally desirable to mix groups of flakes having coatings of different thicknesses to obtain to obtain a macroscopic white coloring in the film. The weight percent of the different groups of flakes that are to be mixed to obtain a macroscopic white coloration can be determined by following the additive color mixture rule. Three colors of flakes were used—red, blue and green, each in an amount of 33 wt %, wherein the weight percents are based on the total flake composition.

Example 4

Figure 11B:
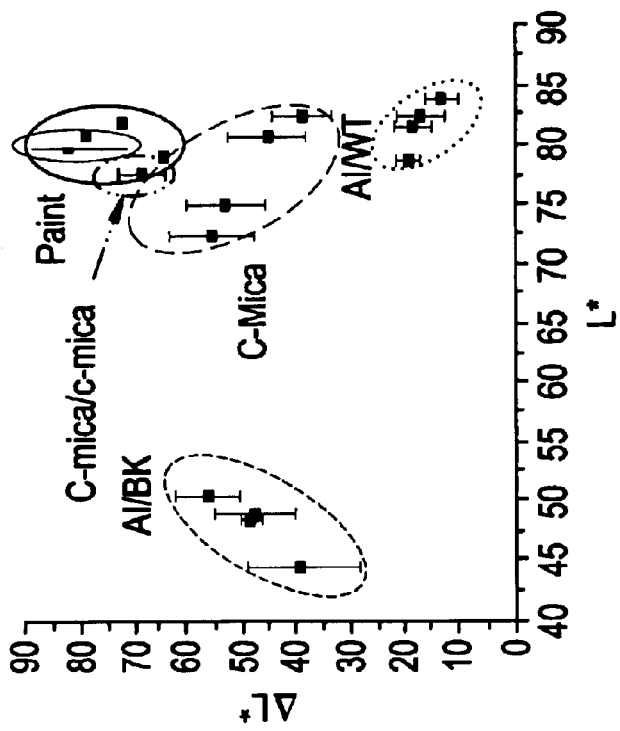
FIGS. 11(a) and (b) are graphical plots showing the (a) lightness (L*) as a function of viewing angle and (b) the change of lightness as a function of viewing angle (ΔL*) versus lightness (L*) respectively when the first and the intermediate layers contain mica coated with titania.
Figure 11A:
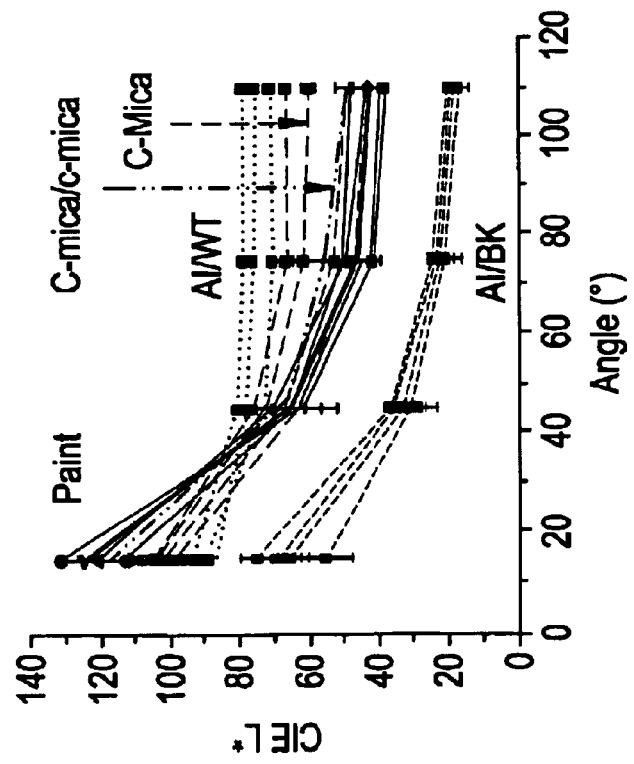

In this example, the intermediate layer containing 1 wt % mica flakes coated with titania was disposed upon a first layer which also contained mica flakes coated with titania. Both layers contained a small amount of carbon black of about 0.001 wt % wherein the weight percents were based on the total weight of the layer. Since the titania coated flakes in the intermediate layer permit a substantial amount of incident light to pass through the intermediate layer, it is generally desirable to minimize the amount of transmitted light and to maximize the amount of reflected light. One possible way of accomplishing this is to use a first layer that can promote an increase in the amount of reflected light, based on the light incident upon the film. In order to promote an increased reflection of incident light, the first layer contains the mica coated with titania flakes and carbon black. The lightness ($L^*$) and the change of lightness as a function of viewing angle ($\Delta L^*$) are shown in the FIGS. 11(a) and (b) respectively. From these graphical plots it can be seen that both $L^*$ and $\Delta L^*$ are almost similar to the silver painted sample.

These experiments clearly demonstrate the need for the preservation of aspect ratio in the flakes as well as the need for an orientation of the flakes in the machine direction i.e., the direction in which the film is extruded. In addition, in order to achieve a silver multilayered film, it is generally desirable to use an intermediate layer as well as a first layer that have oriented flakes and contain carbon black.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A silver multilayered film comprising:
at least one intermediate layer comprising a polymeric resin; a colorant composition and a flake composition, wherein the colorant composition comprises carbon black, coke, single wall carbon nanotubes, multiwall carbon nanotubes, vapor grown carbon nanofibers, or a combination comprising at least one of the foregoing colorants; wherein the flake composition comprises flakes having an aspect ratio of about 2 to about 10,000; wherein the average normal to the individual flakes are oriented at an angle of about 0 to about 75 degrees with a normal to the multilayered film, and wherein the intermediate layer is located between a first layer and an second layer and further wherein the multilayered film has a lightness greater than or equal to about 60 and a change in lightness as a function of viewing angle of greater than or equal to about 40.

2. The film of claim 1, wherein the polymeric resin is a polycarbonate, a polyester, a blend of a polycarbonate and a polyester or a copolymer of a polycarbonate and a polyester.

3. The film of claim 1, wherein the copolymer of the polycarbonate and the polyester is a copolyestercarbonate.

4. The film of claim 1, wherein the flake composition comprises flakes that are silver in color.

5. The film of claim 1, wherein the flake composition comprises flakes that are selected so as to render the film white.

6. The film of claim 1, wherein the flake composition comprises flakes having an aspect ratio of about 2 to about 10,000 prior to processing.

7. The film of claim 1, wherein the flake composition comprises flakes having particle sizes of about 5 to about 250 micrometers prior to processing.

8. The film of claim 1, wherein the intermediate layer comprises flakes in an amount of about 0.1 to about 20 wt % based on the total weight of the intermediate layer.

9. The film of claim 1, wherein the first layer and the second layer comprise a polycarbonate, a polyester, a blend of a polycarbonate and a polyester, or a copolymer of a polycarbonate with a polyester.

10. The film of claim 1, wherein the intermediate layer is disposed upon a surface of the first layer and the second layer is disposed on a surface of the intermediate layer opposite the first layer.

11. The film of claim 1, wherein a third and/or a fourth layer is further disposed between the first and the second layer.

12. The film of claim 1, wherein additional layers are disposed between the first layer and a substrate.

13. The film of claim 10, wherein a surface of the intermediate layer opposite a surface in contact with the first layer is disposed at a distance of about 25 micrometers to about 1000 micrometers from a surface of the second layer in contact with ambient air.

14. The film of claim 1, wherein the second layer comprises an ultraviolet absorber.

15. The film of claim 1, wherein the first layer comprises flakes in an amount of about 0.5 wt % to about 20 wt % and wherein the average normal to the individual flakes are oriented at an angle of about 0 to about 75 degrees with a normal to the multilayered film.

16. The film of claim 1, wherein the first layer comprises a colorant composition.

17. The film of claim 1, wherein the film has a metallic finish and a lightness of greater than or equal to about 60 and a change in lightness as a function of viewing angle of greater than or equal to about 40.

18. The film of claim 1, the film is disposed upon a substrate, and wherein the substrate comprises a polymeric resin.

19. An article manufactured from the film of claim 1.

20. A multilayered film comprising:
an intermediate layer disposed on and in intimate contact with a surface of a first layer and a second layer, wherein the surface of the first layer is disposed on and intimate contact with a surface of the intermediate layer that is opposed to the surface in intimate contact with the surface of the second layer, wherein the intermediate layer comprises a polymeric resin; a colorant composition and a flake composition; wherein the colorant composition comprises carbon black; wherein the flake composition comprises flakes having an aspect ratio of about 2 to about 10,000: wherein the average normal to the individual flakes are oriented at an angle of about 0 to about 75 degrees with a normal to the multilayered film, and further wherein the multilayered film has a lightness greater than or equal to about 60 and a change of lightness as a function of viewing angle of greater than or equal to about 40.

21. The film of claim 20, wherein the first layer, the intermediate layer, and the second layer comprise a polycarbonate, a polyester, a blend of a polycarbonate with a polyester, or a copolymer of a polycarbonate with a polyester.

22. The film of claim 20, wherein the flake composition comprises mica flakes coated with titania.

23. The film of claim 20, wherein the colorant composition further comprises coke, single wall carbon nanotubes, multiwall carbon nanotubes, vapor grown carbon nanofibers, or a combination comprising at least one of the foregoing colorant.

24. The film of claim 22, wherein the titania coating has a thickness of about 0.1 to about 10 micrometers.

25. The film of claim 22, wherein the first layer comprises mica flakes coated with titania.

26. The film of claim 25, wherein the first layer further comprises a fibrous filler.

27. A method of manufacturing a multilayered film comprising:
    deforming a film comprising an intermediate layer located between a first layer and a second layer by an amount effective to produce a multilayered film having a lightness greater than or equal to about 60 and a change of lightness as a function of viewing angle of greater than or equal to about 40; wherein the intermediate layer comprises a polymeric resin; a colorant composition and a flake composition; wherein the colorant composition comprises carbon black; wherein the flake composition comprises flakes having an aspect ratio of about 2 to about 10,000; and wherein the average normal to the individual flakes are oriented at an angle of about 0 to about 75 degrees with a normal to the multilayered film.

28. The method of claim 27, wherein the deforming comprises the application of compressive forces, shear forces and elongational forces.

29. The method of claim 27, wherein the deforming is applied in an extruder, a roll mill or in a combination comprising an extruder and a roll mill.

30. The method of claim 27, wherein the film is further deformed through the use of ultradrawing at ratios of about 2 to about 100.

31. The method of claim 27, wherein the first layer, the intermediate layer, and the second layer comprise polycarbonates, polyesters, blends of polycarbonates with polyesters or copolymers of polycarbonates with polyesters.

32. The method of claim 27, wherein the flake composition comprises mica flakes coated with titania.

33. The method of claim 32, wherein the titania coating has a thickness of about 0.1 about 10 micrometers.

34. The method of claim 27, wherein the first layer comprises a colorant composition and mica flakes coated with titania.

35. The method of claim 24, wherein the first layer further comprises fibrous filler.

36. An article manufactured by the method of claim 27.

* * * * *

UNITED STATES PATENT AND TRADEMARK OFFICE
CERTIFICATE OF CORRECTION

PATENT NO.    : 6,916,528 B2
DATED         : July 12, 2005
INVENTOR(S)   : Zhou et al.

It is certified that error appears in the above-identified patent and that said Letters Patent is hereby corrected as shown below:

<u>Title page,</u>
Item [57], ABSTRACT,
Line 7, delete "an" and insert therefor -- a --.

<u>DRAWINGS,</u>
Sheet 3 of 11, at the top of the figure, insert -- FIG. 3 --.

<u>Column 1,</u>
Line 33, after "and" (first occurrence) delete "an" and insert therefor -- a --.
Line 66, before "FIGS. 4(a)," insert -- Fig.3A depicts a diffuse back layer that scatters transmitted light to increase total L*, but reduces flop. Fig. 3B depicts a black layer that absorbs transmitted light to reduce total L* and maintain flop. Fig. 3C depicts a mica filled back layer that reflects transmitted light to increase total L* and improve flop. --.

<u>Column 3,</u>
Line 9, after "flop" delete "a" and insert therefor -- as --.

<u>Column 9,</u>
Line 44, after "to" delete "as" and insert therefor -- a --.

<u>Column 13,</u>
Line 65, before "and" delete "degrees" and insert therefor -- degree --.
Line 66, before "with" delete "degrees" and insert therefor -- degree --.

<u>Column 14,</u>
Line 12, after "layer" insert therefor -- in --.
Line 25, after "such" delete "a" and insert therefor -- as --.

<u>Column 15,</u>
Line 30, after "The" delete "a".

<u>Column 16,</u>
Line 33, after "1" delete "degrees" and insert therefor -- degree --.

UNITED STATES PATENT AND TRADEMARK OFFICE
CERTIFICATE OF CORRECTION

PATENT NO. : 6,916,528 B2
DATED : July 12, 2005
INVENTOR(S) : Zhou et al.

It is certified that error appears in the above-identified patent and that said Letters Patent is hereby corrected as shown below:

<u>Column 19,</u>
Line 39, after "flates" delete "was" and insert therefor -- were --.

<u>Column 20,</u>
Line 16, after "surface" delete "the".
Line 20, after "FIG." delete "6(b)" and insert therefor -- 6(b)) --.

Signed and Sealed this

Eleventh Day of October , 2005

JON W. DUDAS
*Director of the United States Patent and Trademark Office*